Aug. 17, 1965 F. WÖSSNER 3,201,112
HYDROPNEUMATIC SUSPENSION UNIT
Filed Dec. 10, 1963
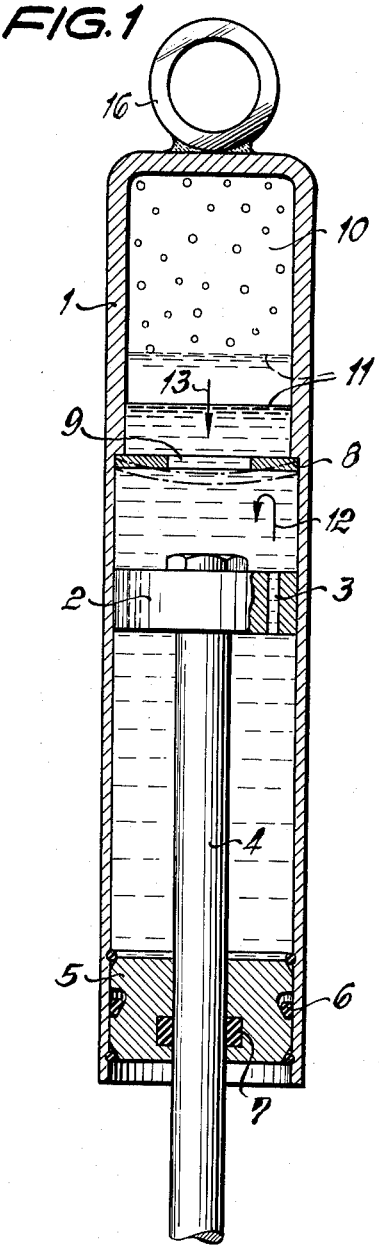
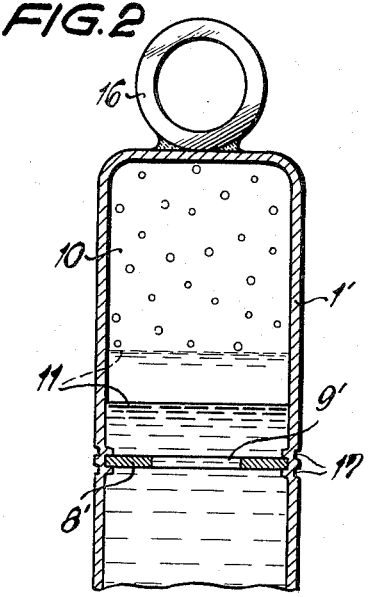
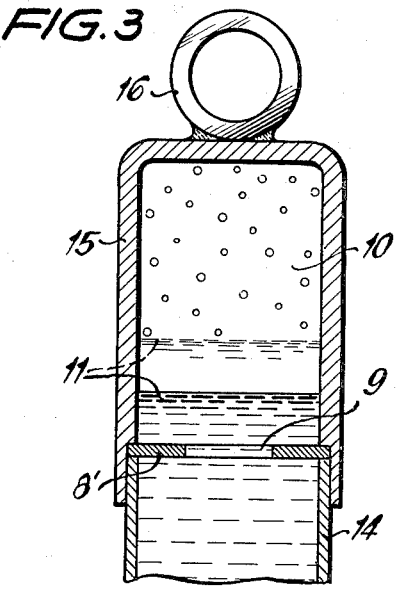
INVENTOR
Felix Wössner
By Richard Ernst
Ag't

United States Patent Office 3,201,112
Patented Aug. 17, 1965

3,201,112
HYDROPNEUMATIC SUSPENSION UNIT
Felix Wössner, Schweinfurt am Main, Germany, assignor to Fichtel & Sachs A.G., Schweinfurt am Main, Germany, a corporation of Germany
Filed Dec. 10, 1963, Ser. No. 329,523
Claims priority, application Germany, Dec. 11, 1962, F 38,519
17 Claims. (Cl. 267—64)

This invention relates to so-called air-oil or hydropneumatic suspension units for automotive vehicles and the like, and particularly to a hydropneumatic suspension unit in which a liquid and a gaseous filling component are contained in a common space without an interposed partition, and affect the relative movements of a cylinder and of a piston.

Shock absorber or spring units of the aforedescribed type rely for effectiveness on the separation of the liquid and gas components which are of different specific gravity. If the components are partly dispersed in each other, the proper functioning of the unit is impaired.

The primary object of the invention, therefore, is the provision of a suspension unit of the type described in which intermixing of the two filling components is substantially prevented, and spontaneous separation under the forces of gravity is favored.

Another object is the provision of a suspension unit which is simple in its design and can be built at low cost.

Yet another object is the provision of a suspension unit in which the gaseous component does not make contact with a seal between structural elements of the unit which move relative to each other during operation of the device.

A further object is a suspension unit capable of being installed in such a manner that the liquid filling component moves jointly with the sprung portion of the vehicle.

An additional object is the provision of a suspension unit in which the pressure of the gaseous component can be held relatively low without unfavorable effects on the performance of the unit during the expansion stroke.

A more specific object is the provision of a suspension unit in which several streams of fluid filling components may move adjacent each other during operation of the device without interfering with each other.

With these and other objects in view, the suspension unit of the invention, in one of its aspects, consists of a cylinder and of a piston in the cylinder. The piston divides the cavity of the cylinder into two compartments. A narrow duct in the piston has respective orifices in the two compartments. A piston rod extends from the piston through one of the compartments, and through an end wall of the cylinder. The piston rod portion which passes through the end wall is of uniform cross section and is movably sealed to the end wall.

The other cylinder compartment is divided into two axial portions by a radially projecting annular baffle plate attached to the cylinder wall. A relatively large central opening in the baffle plate connects the two portions. The cross sectional area or flow section of the baffle plate opening is substantially greater than the cross section of the aforementioned uniform portion of the piston rod.

Other features and many of the attendant advantages of this invention will be readily appreciated as the same becomes better understood by reference to the following detailed description when considered in connection with the accompanying drawing wherein:

FIG. 1 shows a hydropneumatic suspension unit of the invention in elevational section on its axis;

FIG. 2 shows a detail of a modified unit in a fragmentary view corresponding to FIG. 1; and FIG. 3 illustrates yet another modified unit in the manner of FIG. 2.

Referring now to the drawing in detail, and initially to FIG. 1, there is seen a cylinder 1 of unitary structure. The axis of the cylinder is vertical in the operative position illustrated. Its top is closed by an integral axial end wall.

A piston 2 is axially slidable in the cylinder cavity, and separates an upper from a lower compartment in the cylinder. Several narrow axial ducts 3 pass through the piston 2 and have respective orifices in the upper and lower compartments. The ducts 3 are arranged in a circle about the cylinder axis, and are close to the cylinder walls.

The piston 2 is fixedly attached to a cylindrical piston rod 4 which passes through the lower compartment of the cylinder 1, and outward through an axially secured plug 5 which closes the lower end of the cylinder 1. A downwardly tapering annular groove in the outer cylindrical surface of the plug 5 holds a rubber ring 6 which conforms to the lower portion of the groove, and is forced downward by the internal pressure in the cylinder 1 so as to seal the plug 5 to the cylinder 1. A packing 7 in a central bore of the plug 5 movably seals the plug to the piston rod 4.

The upper compartment of the cylinder 1 is axially divided by a baffle plate 8 which is a flat annular disk extending transversely of the cylinder axis over a portion of the cross sectional area of the cylinder 1. The baffle plate obstructs the cylinder section except for a free remainder in central circular opening 9 of the plate 8 which has a cross section or effective flow section which is two to three times the cross section of the piston rod 4. The diameter of the opening 9 is smaller than that of the circle on which the ducts 3 are located so that the orifices of the ducts in the upper compartment are radially offset from the opening 9 and face the imperforate wall of the plate 8.

The baffle plate 8 is fixedly held in place by internal compressive stresses and by an integral shoulder or step on the internal wall of the cylinder 1. As indicated by a chain-dotted line, the baffle plate 8 when in the relaxed condition is of arcuately curved shape, the curvature being shallow and conical or spherical. To secure the plate 8 in position, the plate is flattened against the shoulder of the cylinder 1, and retains its axial position under the internal resilient stresses generated thereby.

In the operative position illustrated, the lower compartment of the unit and the portion of the upper compartment under the baffle plate 8 are filled by a liquid 11 such as automotive hydraulic fluid or oil which also permanently occupies a portion of the upper compartment above the baffle plate 8. The remainder of the upper compartment is filled with a gas 10 such as air or nitrogen under a pressure above atmospheric pressure in a manner known in itself.

The integral top wall of the cylinder 1 carries a fastening ring 16 by means of which the suspension unit is attached to the sprung mass of a vehicle, more specifically the vehicle body, in a manner conventional in itself. A corresponding fastening ring on the end of the piston rod 4 outside the cylinder 1 connects the piston 3 to the unsprung mass of the vehicle, more specifically to the axle assembly of a wheel, as is also conventional.

When the vehicle travels over an uneven surface, the sprung and unsprung masses thereof move vertically toward and away from each other, and the piston of the suspension unit performs corresponding expansion and compression strokes. During the expansion stroke of the piston, the effective length of the unit increases. Liquid is forced from the lower compartment through the ducts 3 into the upper compartment of the cylinder 1.

The liquid streams discharged from the upper orifices of the ducts 3 impinge at high speed against the imperforate wall of the baffle plate 8 and rebound downward as indicated by the arcuate arrow 12. The reduction of external pressure on the fastening rings permits the gas 10 to expand, and fluid is driven downward at relatively low speed through the opening 9 as indicated by a straight arrow. Because of the offset of the opening 9 and the ducts 3 transverse of the cylinder axis, the two moving fluids do not interfere with each other. Where they meet, their paths are approximately parallel. There is little or no turbulence at the interface, and there is no foaming.

During the upward compression stroke of the piston 3, which occurs during the shortening of the unit, displaced fluid is moved upward against the direction of the arrow 13 and downward through the ducts 3.

The suspension unit may be supplied with oil and/or gas through the seal between the plug 5 and the cylinder 1. When fluid under superior pressure is fed from the outside against the ring 6, the ring is displaced upward and permits entry of the high-pressure fluid through the narrow annular gap between the cylinder 1 and the plug 5 which is not visible in FIG. 1 because of the relatively small scale of the drawing.

The embodiments of the invention illustrated in FIGS. 2 and 3 differ from that shown in FIG. 1 by the manner in which the flat baffle plate 8' is held in position. The cylinder 1' seen in FIG. 2 has two axially spaced rows of internal radial projections and of corresponding external recesses 17 between which the plate 8' is received. The projections are preferably formed by corrugating the cylinder 1' between shaping rolls in a known manner. The projections extend in a circle about the circumference of the cylinder, and may be continuous or circumferentially spaced from each other.

The cylinder of the suspension unit illustrated in FIG. 3 consists of an upper portion 15 and a separate lower portion 14. An annular, axially open recess in the heavy-walled upper portion 15 forms a shoulder which abuts from above against the plate 8'. The upper rim of the cylindrical lower portion 14 of smaller wall thickness is received in the recess and abuts from below against the plate 8'. The cylinder portions 14, 15 are sealed to each other by their engagement with the plate 8', and they are mechanically fastened to each other in a manner not further illustrated.

The baffle plates 8, 8' are simple flat or arched disks. They reliably cause rebound of the jets of liquid expelled from the ducts 3. The rate of fluid flow through the large central opening 9 in the plates 8, 8' is so slow that mixing between gas and liquid by tubulence is avoided. Foam which is harmful to the performance of hydropneumatic suspension units cannot be formed in significant amounts.

The pattern of fluid flow in the suspension unit of the invention is favorable to smooth operation not only during the compression stroke, but also during the expansion stroke. The streams of liquid emerging from the orifices of the ducts 3 in an upward direction are guided in such a manner that they do not hamper the downward flow of fluid through the opening 9.

The large central opening 9 in the baffle plates 8, 8' is located in such a manner that it favors release of any gas that may be trapped in the liquid under the baffle plate by spontaneous separation under the force of gravity. Most favorable operating characteristics are achieved when the opening is between twice and three times the cross sectional area of the piston rod 4.

The advantages of the baffle plate arrangement of the invention are fully available only, when the piston rod passes through that end wall of the cylinder which is remote from the body of gas within the cylinder. With the piston rod extending downward from the piston, a simple baffle plate of the type disclosed becomes possible.

The cylinder 1 which contains the liquid 12 is attached to the sprung body of the vehicle, and is thus subjected to less vigorous shaking than the unsprung wheel and axle. The liquid surface within the cylinder 1 is relatively little distrubed by the movements of the vehicle, and the tendency of the liquid to be mixed with the gas filling component is reduced.

The latter component is entirely contained between a continuous seamless wall of the cylinder and the liquid component. There is no contact between the gas and a mechanical seal between two structural elements of the unit which move relative to each other during vehicle operation. Gas leakage is virtually impossible. The seals which connect the piston rod to the cylinder retain only liquid, and can thus be made fluid-tight in a relatively simple manner.

The piston 3 transmits positive pressure to the gas 10 during the compression stroke, that is, the stroke of the unit in which the effective length thereof is reduced. The necessary higher damping force during the expansion stroke may therefore be produced at a lower average gas pressure in the unit. Such lower pressure reduces the risk of gas leakage, and reduces the variation in the performance of the unit with changing ambient temperature.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. A hydropneumatic suspension unit comprising, in combination:
    (a) a cylinder member having an axis, and defining a cavity about said axis;
    (b) a piston member mounted in said cavity for axial reciprocating movement, said piston member sealingly dividing said cavity into two compartments and being formed with a duct axially extending therethrough having respective orifices in said compartments, the flow area of said duct being substantially smaller than the cross-sectional area of said cavity;
    (c) a piston rod member secured to said piston member and axially extending therefrom through one of said compartments, a portion of said piston rod member having a uniform cross section and passing outward through said cylinder member in movable sealing engagement with the same; and
    (d) annual baffle plate means projecting from said cylinder member toward said axis in the other one of said compartments, said baffle plate means defining two axially spaced portions in said other compartment and being formed with an opening axially extending therethrough and connecting said portions, the cross sectional area of said opening being substantially greater than the cross section of said piston rod member portion.

2. A unit as set forth in claim 1, further comprising a liquid substantially filling said one compartment and partly filling said other compartment, and a gas under a pressure higher than atmospheric pressure filling the remainder of said other compartment.

3. A unit as set forth in claim 1, wherein said baffle plate means includes an imperforate wall portion, and said opening and the orifice of said duct in said other compartment are offset relative to each other transversely of said axis in such a manner that said orifice faces said imperforate wall portion of said baffle plate means.

4. A unit as set forth in claim 1, wherein said baffle means has a radially extending imperforate wall portion, and the orifice of said duct in said other compartment faces said wall portion.

5. A unit as set forth in claim 1, wherein said opening is adjacent said axis, and said duct is remote from said axis.

6. A unit as set forth in claim 1, wherein said opening is centrally located in said baffle means and of substantially circular shape.

7. A unit as set forth in claim 1, wherein the cross sectional area of said opening is not substantially less than twice the cross section of said piston rod member portion and not substantially more than three times the cross section of said piston rod member portion.

8. A unit as set forth in claim 1, further comprising a plurality of axially spaced radial projections on said cylinder member in said cavity therof, said baffle means being axially retained between said projections.

9. A unit as set forth in claim 1, wherein said cylinder member has two wall portions secured to each other in simultaneous axial abutment against said baffle means from opposite directions.

10. A unit as set forth in claim 1, wherein said baffle plate means includes a plate member axially secured in said cylinder member and extending in a radial plane, said plate member being formed with said opening therethrough.

11. A unit as set forth in claim 1, further comprising attaching means on said cylinder member and on said piston member for respectively attaching the same to the sprung mass and to the unsprung mass of a vehicle.

12. A suspension arrangement comprising, in combination:
  (a) a sprung mass;
  (b) an unsprung mass;
  (c) a cylinder member secured to said sprung mass, said cylinder member having a vertically extending axis and defining a cavity about said axis;
  (d) a piston member mounted in said cavity for axial reciprocating movement, said piston member sealingly dividing said cavity into an upper compartment and a lower compartment, and being formed with a duct therethrough having respective orifices in said compartments, the flow section of said duct being substantially smaller than the cross-sectional area of said cavity;
  (e) a piston rod member secured to said piston member and extending downwardly therefrom through the lower one of said compartments, a portion of said piston rod member having a uniform cross section and passing outward through said cylinder member in movable sealing engagement with the same, said portion of said piston rod member being secured to said unsprung mass;
  (f) annular baffle plate means axially secured in the upper one of said compartments and having a central opening, said baffle plate means projecting from said cylinder member toward said axis and defining two axially spaced portions in said upper compartment, the opening through said baffle means connecting said portions, the cross section of said opening being substantially greater than the cross section of said piston rod member portion;
  (g) a liquid substantially filling said lower compartment, and partially said upper compartment; and
  (h) a gas under a pressure higher than atmospheric pressure filling the remainder of said upper compartment.

13. An arrangement as set forth in claim 12, wherein said sprung mass includes the body of a vehicle, and said unsprung mass includes a wheel of said vehicle.

14. An arrangement as set forth in claim 12, wherein said opening is centrally arranged in said cylinder member adjacent said axis, and said baffle means includes an annular imperforate wall portion about said opening, said duct being spaced from said axis, and the orifice thereof in said upper compartment facing said imperforate wall portion, the effective flow section of said opening being not less than twice the cross section of said uniform piston portion, and not more than three times the cross section of said uniform piston portion.

15. A hydropneumatic suspension unit comprising, in combination:
  (a) a cylinder member having an axis and an axially extending wall about said axis, said wall defining a cavity in said cylinder member;
  (b) a piston member mounted in said cavity for axial reciprocating movement in engagement with said wall, said piston member sealingly dividing said cavity into two axially spaced compartments and being formed with a duct therethrough having respective orifices in said compartments, the flow area of said duct being substantially smaller than the cross-sectional area of said cavity;
  (c) a piston rod member secured to said piston member and axially extending therefrom through one of said compartments, a portion of said piston rod member having a uniform cross section and passing outward through said cylinder member in movable sealing engagement with the same; and
  (d) a baffle plate in the other one of said compartments opposite the orifice of said duct in said other compartment, said baffle plate extending transversely of said axis over an annular portion of said cross sectional area contiguously adjacent said wall and leaving the remainder of said area free, said remainder being contiguously adjacent said axis and substantially greater than the cross section of said piston rod member portion and greater than said flow area, and being radially offset from the orifice of said duct in said other compartment.

16. A unit as set forth in claim 15, wherein said remainder is between two and three times the cross section of said piston rod member portion.

17. A hydropneumatic suspension unit comprising, in combination:
  (a) a cylinder member having an axis, and defining a cavity about said axis;
  (b) a piston member mounted in said cavity for axial reciprocating movement, said piston member sealingly dividing said cavity into two compartments and being formed with a duct axially extending therethrough having respective orifices in said compartments, the flow area of said duct being substantially smaller than the cross-sectional area of said cavity;
  (c) a piston rod member secured to said piston member and axially extending therefrom through one of said compartments, a portion of said piston rod member having a uniform cross section and passing outward through said cylinder member in movable sealing engagement with the same; and
  (d) baffle plate means including a flat annular member projecting from said cylinder member toward said axis in the other one of said compartments, said annular member defining two axially spaced portions in said other compartment and being formed with an opening axially extending therethrough and connecting said portions, the cross sectional area of said opening being substantially greater than the cross section of said piston rod member portion, said annular member being under compressive stress, and, when in the relaxed condition, having a central portion axially offset from an integral circumferential portion of said annular member.

References Cited by the Examiner

UNITED STATES PATENTS

| | | | |
|---|---|---|---|
| 2,325,430 | 7/43 | Setz | 188—100 |
| 2,708,573 | 5/55 | Rovoldt | 267—1 |
| 2,914,089 | 11/59 | Allinquant | 267—64 X |
| 2,939,696 | 6/60 | Tuczek | 267—64 |
| 3,070,191 | 12/62 | Allinquant | 188—100 X |

FOREIGN PATENTS

| | | |
|---|---|---|
| 1,108,842 | 1/56 | France. |
| 1,277,854 | 10/61 | France. |

ARTHUR L. LA POINT, *Primary Examiner.*